(12) United States Patent
Seng et al.

(10) Patent No.: US 7,536,625 B2
(45) Date of Patent: May 19, 2009

(54) MAINTAINING DATA INTEGRITY IN A DATA STORAGE SYSTEM

(75) Inventors: Edmun ChianSong Seng, Singapore (SG); UttHeng Kan, Singapore (SG); AC Lim, Singapore (SG); Det Hau Wu, Singapore (SG); Lin Nah Lim, Singapore (SG); Stanton M. Keeler, Longmont, CO (US); Curtis M. Pleiss, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 83 days.

(21) Appl. No.: 11/615,297

(22) Filed: Dec. 22, 2006

(65) Prior Publication Data

US 2007/0150774 A1 Jun. 28, 2007

Related U.S. Application Data

(63) Continuation-in-part of application No. 10/880,794, filed on Jun. 30, 2004, now Pat. No. 7,263,650.

(51) Int. Cl.
*H03M 13/00* (2006.01)
(52) U.S. Cl. ...................................... 714/755
(58) Field of Classification Search ................. 714/763, 714/769, 755
See application file for complete search history.

(56) References Cited

U.S. PATENT DOCUMENTS

| | | | |
|---|---|---|---|
| 5,068,858 A | 11/1991 | Blaum et al. | |
| 5,467,361 A | 11/1995 | Shipman, Jr. | |
| 5,517,484 A | 5/1996 | Takagi et al. | |
| 5,602,857 A | 2/1997 | Zook et al. | |
| 5,721,816 A | 2/1998 | Kusbel et al. | |
| 5,844,919 A | 12/1998 | Glover et al. | |
| 6,088,825 A * | 7/2000 | Ikushima et al. | 714/769 |
| 6,125,469 A | 9/2000 | Zook et al. | |
| 6,219,814 B1 | 4/2001 | Coker et al. | |
| 6,324,157 B1 * | 11/2001 | Kotani | 369/275.3 |
| 6,345,366 B1 | 2/2002 | Asano et al. | |
| 6,606,210 B1 | 8/2003 | Coker et al. | |
| 6,661,758 B2 | 12/2003 | Sako et al. | |
| 6,754,018 B2 | 6/2004 | Takahashi | |
| 6,903,887 B2 | 6/2005 | Asano et al. | |
| 6,981,197 B2 | 12/2005 | Liu et al. | |
| 7,038,993 B2 | 5/2006 | Minamino et al. | |
| 7,043,679 B1 * | 5/2006 | Keltcher et al. | 714/763 |
| 7,080,306 B1 | 7/2006 | Sugawara et al. | |
| 7,106,679 B2 | 9/2006 | Sasaki et al. | |
| 2005/0273688 A1 | 12/2005 | Argon | |
| 2006/0005068 A1 | 1/2006 | Keeler et al. | |
| 2006/0227450 A1 | 10/2006 | Liu et al. | |

* cited by examiner

*Primary Examiner*—Shelly A Chase
(74) *Attorney, Agent, or Firm*—Leanna Taveggi Farrell; Westerman, Champlin & Kelly, P.A.

(57) ABSTRACT

A method of recovering data on a storage medium is provided. A first error correction scheme is performed on a high risk region of the storage medium. A second error correction scheme is performed on a remaining portion of the storage medium.

21 Claims, 8 Drawing Sheets

MAINTAINING DATA INTEGRITY IN A DATA STORAGE SYSTEM

The present application is a continuation-in-part of U.S. patent application entitled "ERROR CORRECTION EXTENDING OVER MULTIPLE SECTORS OF DATA STORAGE", Ser. No. 10/880,794, filed Jun. 30, 2004, of which is hereby incorporated by reference in its entirety.

FIELD OF THE DISCLOSURE

The present disclosure relates generally to data storage systems, and more particularly, but not by limitation, to recovering data in a storage medium.

BACKGROUND

A typical data storage system includes a housing that encloses a variety of components. For example, one type of a data storage system includes at least one rotating disc or storage medium for storage of digital information in a plurality of circular, concentric data tracks. The storage medium passes under a respective bearing slider surface. Each slider carries one or more transducers, which write information to and/or reads information from the data surfaces of the disc(s). The slider and transducers are often together referred to as a "head."

Such data storage systems also include an actuator assembly that moves the head or heads from an inner diameter to an outer diameter of the storage medium, across data tracks under control of electronic circuitry. The actuator assembly includes a track accessing arm, a suspension for each head and a voice coil motor. In general, each head is supported by a suspension that is in turn attached to the track accessing arm. The voice coil motor rotates the track accessing arm about a pivot shaft to position a head over a desired data track.

Certain types of data storage devices include high risk data regions where the storage medium is susceptible to damage and/or where data integrity is important. One example region includes a load/unload region where the head is loaded onto the storage medium and unloaded from the storage medium within a reserved load/unload region on the medium. Commonly, data is not stored in the load/unload region because it has always been considered a high-risk area due to its great susceptibility to damage caused by its frequent contact with the slider. However, as the size of data storage systems continues to reduce, there is a continued demand for more and more data capacity. One way to capitalize on data capacity is to store data in the load/unload region of the storage medium.

SUMMARY

A method of recovering data on a storage medium is provided. A first error correction scheme is performed on a high risk region of the storage medium. A second error correction scheme is performed on a remaining portion of the storage medium.

To correct errors on the high risk region of the storage medium, a first enhanced error correction process is performed. The first enhanced error correction process includes decoding a selected data sector in the high risk region of the storage medium using an error correction code and correcting errors up to a first threshold level of correctable errors. If decoding and correcting errors up to the first threshold level is unsuccessful, then the first enhanced error correction process also includes decoding the selected data sector using the error correction code and correcting errors up to a second, greater threshold level of correctable errors. If error correction is unsuccessful after performing the first enhanced error correction process, then a second enhanced error correction process is performed. The second enhanced error correction process includes performing error correction using a superparity sector that corresponds with the selected data sector to correct errors in the selected data sector if decoding and correcting errors up to the second threshold was unsuccessful in correcting all errors in the selected data sector. The superparity sector is generated from a plurality of data sectors including the selected data sector in a data track.

Other features and benefits that characterize embodiments of the present disclosure will be apparent upon reading the following detailed description and review of the associated drawings.

DETAILED DESCRIPTION OF ILLUSTRATIVE EMBODIMENTS

Figure 1:
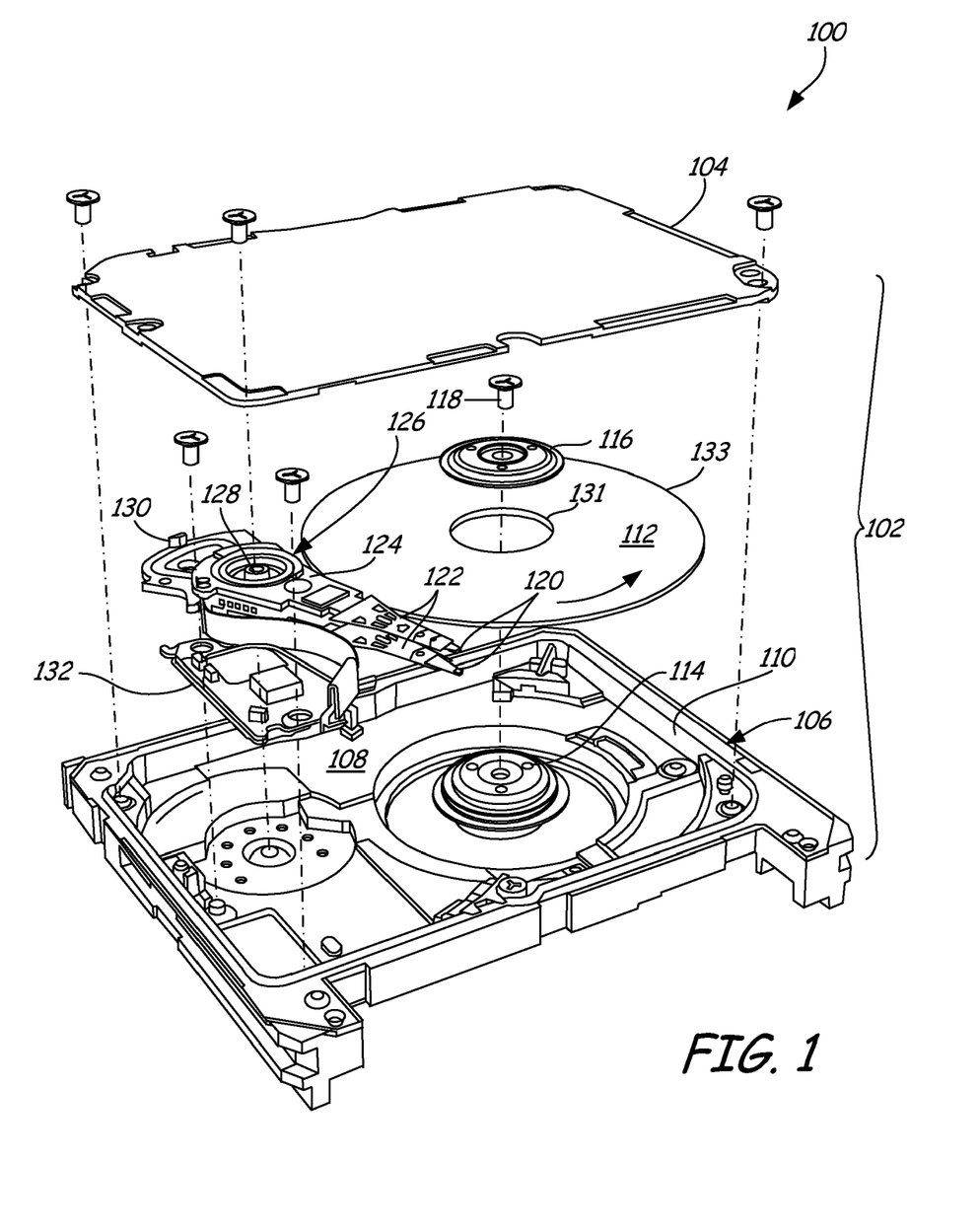
FIG. 1 is an exploded perspective view of a data storage system.

FIG. 1 is an exploded perspective view of a data storage system 100 in which one or more embodiments of the present disclosure are useful. In one embodiment data storage system 100 includes a disc drive. One or more embodiments of the present disclosure are also useful in other types of data storage and non-data storage systems.

Data storage system 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a disc or storage medium 112. Although FIG. 1 illustrates storage medium 112 as a single disc, those skilled in the art should understand that more than one disc can be used in disc drive 100. Storage medium 112 stores information in a plurality of circular, concentric data tracks and is mounted on a spindle motor assembly 114 by a disc clamp 116 and pin 118. Spindle motor assembly 114 rotates medium 112 causing its data surfaces to pass under respective hydrodynamic bearing slider surfaces. Each surface of medium 112 has an associated slider 120, which carries one or more transducers that communicate with the surface of the medium. The slider and transducers are often together referred to as a read/write head.

In the example shown in FIG. 1, sliders 120 are supported by suspension assemblies 122, which are, in turn, attached to track accessing arms 124 of an actuator mechanism 126. Actuator mechanism 126 is rotated about a shaft 128 by a voice coil motor 130, which is controlled by servo control circuitry within internal circuit 132. Voice coil motor 130 rotates actuator mechanism 126 to position sliders 120 relative to desired data tracks, between a disc inner diameter 131 and a disc outer diameter 133.

Data storage devices include high risk data regions where the storage medium is susceptible to damage and/or where data integrity is important. Examples of high risk regions on storage medium 112 where data integrity is important includes regions on the medium where data on data tracks are placed very closely together and regions on the medium where the signal-to-noise ratio is low. Another high risk data region includes areas on storage medium 112 that are susceptible to head medium contact. One example includes regions on storage medium 112 where slider 120 is loaded and unloaded to and from storage medium 112.

In certain types of disc drives, slider 120 is unloaded from storage medium 112 during periods of inactivity. When the disc drive becomes active again, slider 120 is loaded back onto storage medium 120. For example, a ramp (not shown) is commonly used to lift the slider from the surface of the medium as the suspension is rotated toward the ramp. Similarly, the ramp loads the slider back onto the disc surface as the suspension is rotated away from the ramp. The ramp can be located near the disc inner diameter or the disc outer diameter, for example. Other methods can also be used for loading and unloading the slider.

Figure 2:
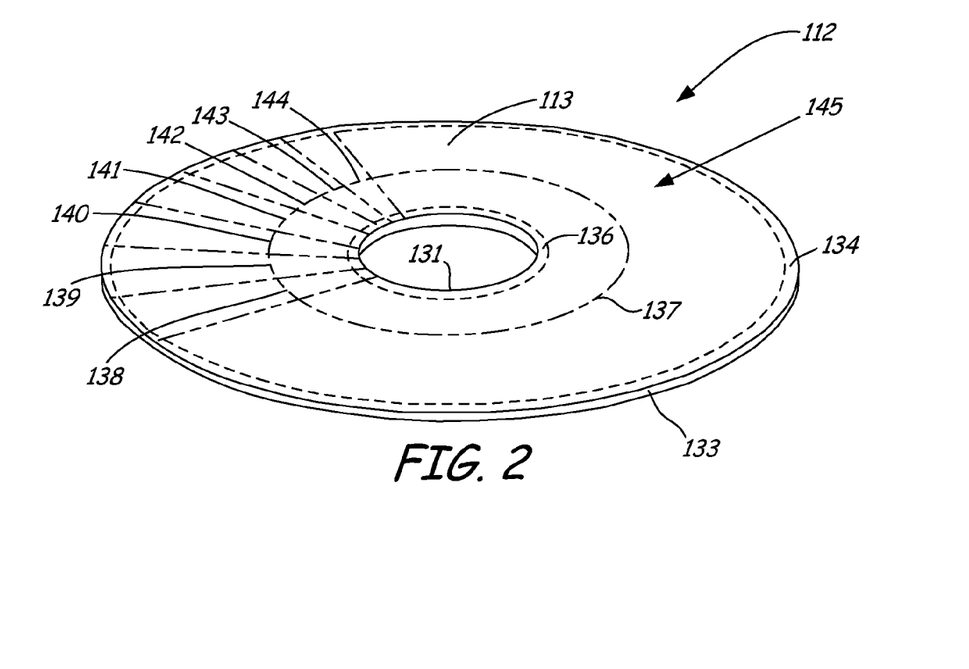
FIG. 2 illustrates a more detailed perspective view of a storage medium within the data storage system shown in FIG. 1.

FIG. 2 is a perspective view of storage medium 112 which illustrates one example of a high risk data region. In FIG. 2, the high risk region includes a load/unload region in accordance with an embodiment. In FIG. 2, storage medium 112 includes a surface 113 having a plurality of data tracks, such as data track 137, and a load/unload region 134. Load/unload region 134 is a portion of storage medium 112 located at or near outer diameter 133 and is illustrated in dashed lines. It should be understood that storage medium 112 can additionally or alternatively include a load/unload region 136 that is located at or near inner diameter 131 or any other portion of surface 113. Load/unload regions 134 and 136 define areas on surface 113 at which the slider is loaded onto and unloaded from the storage medium in load/unload type storage devices. Such an area of storage medium 112 is in frequent physical contact with the slider and is therefore susceptible to damage. The remaining region of storage medium 112 (not including load/unload regions 134 and 136) is denoted by lead line 145.

Figure 3:
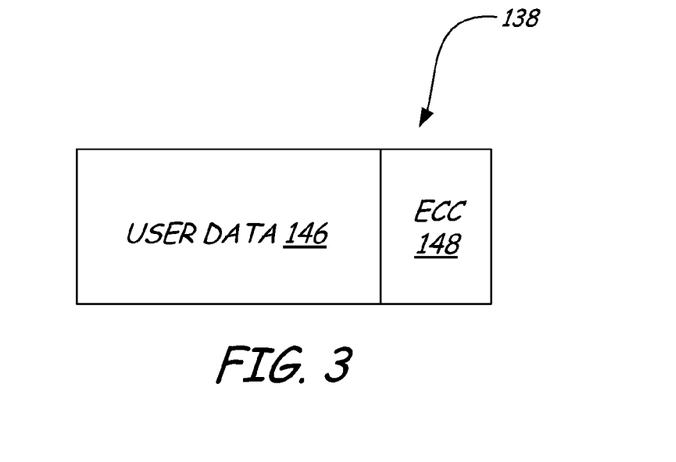
FIG. 3 illustrates a diagram of an exemplary data sector.

In some embodiments, the data tracks on storage medium 112 are logically divided into a plurality of data sectors. For example, data track 137 is logically divided into data sectors 138-144. Each data sector typically includes 512 bytes of data, but could have any suitable size. FIG. 3 illustrates a simplified diagram of an example of data sector 138 on data track 137 of storage medium 112. Example data sector 138 includes user data block 146 and one or more additional bits of information 148, which has been encoded with an error correction code (ECC). In the example shown in FIG. 3, the group of redundant information is padded at the end of data sector 138.

A simple ECC code is based on parity. A parity bit is added to a group of data bits, such as data block 146, and has a logic state that is selected to make the total number of ones (or zeros) in a data unit either even or odd. The original data block is then stored on storage medium 112 with the additional parity bit as a modified data block. When the modified data block is read from the storage medium, an ECC decoder checks the parity of the block against an expected value. If the parity is correct, the ECC detector assumes there are no bit errors. If the parity is incorrect, the ECC detection circuit assumes there is an error in the data.

More complex ECC codes have also been used for enabling not only detection of additional errors but also correction of some of the detected errors. For example, a single-error correction, double-error detection (SEC-DED) Hamming code adds enough additional parity bits to enable the detection circuit to detect and correct any single-bit error in a data word and detect two-bit errors. A Reed Solomon ECC Code corrects symbols (groups of bits) not bits. Reed Solomon Error Correcting Codes are often used in data storage systems, such as in disc drives. The main purpose of the ECC is to correct any errors occurring during the read back of data from the storage medium. In a disc drive, user data is formatted into sectors, as shown in FIG. 2. As mentioned above, each sector typically includes 512 bytes of user data. The data of each sector is encoded into an ECC codeword. Each codeword contains the user data and the redundancy (e.g., parity symbols) generated by the encoder. In the example shown in FIG. 3, data sector 138 from track 137 includes an ECC codeword having a user data block 146 and an ECC block 148. The correction capability of each code is determined by the quantity of redundancy. With more redundancy, more error can be corrected. However, more redundancy reduces the area at which the user data can be stored on the storage medium.

The data sector in the remaining region 145 of storage medium 112 includes ECC codewords having a correction capability that is optimized for error correction as well data throughput of the data storage system. To optimize data throughput, data sectors in remaining region 145 tend to have a low error correction capability.

In accordance with an embodiment of the disclosure, load/unload regions 134 and 136 of storage medium 112 are utilized for the storage of data and include a more enhanced data integrity protection scheme than a typical data integrity protection scheme that is applied to remaining region 145 of storage medium 112. For example, an embodiment of the disclosure can perform a first error correction scheme on a load/unload region of storage medium 112 and a second, different error correction scheme on remaining region 145 of storage medium 112.

In general, data sectors located on remaining region 145 of storage medium 112, such as example data sector 138, utilize a conventional sector-based error correction scheme to detect and potentially correct error events that the data sectors may experience on a sector by sector basis. Each data sector is padded with an ECC block, such as ECC 148. Conventional sector-based error correction schemes attempt to detect and correct errors in user data block 146 by utilizing padded ECC block 148. If errors exist, conventional sector-based error correction determines the position and the value of the errors and corrects them.

In accordance with an embodiment of the disclosure, data sectors located on load/unload regions 134 and 136 (FIG. 2) utilize an error correction scheme that is different than the conventional error correction scheme utilized in remaining region 145 of storage medium 112. The enhanced error correction scheme utilized in load/unload regions 134 and 136 includes a first enhanced error correction process and a second enhanced error correction process. The first enhanced error correction process recovers errors in a select data sector based on information obtained only from the selected data sector. The second enhanced error correction process recovers errors in a data sector based on information obtained from multiple data sectors.

In the first enhanced error correction process, each data sector in load/unload regions 134 and 136 (FIG. 2) is encoded with a maximum correction capability. A series of experiments can be performed to determine the maximum correction capability that is required for a particular application. The write channel of the data storage system is therefore configured to write each data sector in load/unload regions 134 and 136 with an amount of redundancy information (ECC) required to satisfy the set maximum correction capability. Although the redundant data in each data sector is able to correct up to a maximum threshold of correctable errors based on the maximum correction capability, a controller of the data storage system is configured so that the ECC decoder is able to limit the correction capability to a lower threshold than the maximum threshold to increase data throughput when there is a low number of bit errors in the data read from a particular data sector. For example, a maximum threshold of correctable errors can be equal to 30. The ECC decoder can be configured to limit the correction capability to a threshold that is less than the maximum threshold, such as a threshold of correctable errors equal to 20. It should be noted that these threshold values are merely example values and other threshold values can be used as long as a first threshold level is less than a second threshold level, which may be equivalent to the maximum threshold.

In operation, when a data sector is read from the storage medium, the ECC decoder detects whether the sector contains any errors and, if so, attempts to correct up to the first threshold level of correctable errors. If the decoder is unsuccessful in correcting all of the detected errors at the first threshold level of correctable errors (i.e., a non-zero Syndrome was generated), the decoder makes a second attempt to correct errors in the data sector. In the second attempt, the decoder attempts to correct errors in a data sector up to the maximum or second threshold level of correctable errors. Thus, more processing time can be used selectively if necessary to correct an additional number of errors with the first enhanced error correction process.

Defective regions on storage medium 112 which result from erroneous data recovery are a detrimental phenomenon. During data storage system certification, defect mapping algorithms are used to map these defective regions to ensure that user data is not written on these regions. Regardless of the use of defect mapping algorithms, there is still a small probability that some tiny defects escape defect mapping. Most tiny defects are harmless and can be corrected with some form of ECC, however, some tiny defects can grow over time. For example, there is a high probability of head contact against the load/unload regions 134 and/or 136 of storage medium 112. The more the head contacts a tiny defect, the longer the defect grows. By attempting to correct data up to the first threshold level of correctable errors, tiny defects which escape the defect mapping process are corrected. When a data sector requires a more than usual amount of ECC power to perform correction, it can indicate that the data sector includes a grown defect and has to be mapped away to ensure integrity of the user data. Before the data sector is mapped away, data in the data sector is reallocated to a spare sector.

If the first enhanced error correction process is unable to successfully correct all errors in a data sector, then errors are attempted to be corrected using the second enhanced error correction process. As previously discussed, the second enhanced error correction process corrects errors utilizing information obtained from multiple data sectors (e.g., shared redundancy error correction). For example, shared redundancy error correction can utilize redundancy information that is distributed along an entire data track to correct errors.

Figure 4:
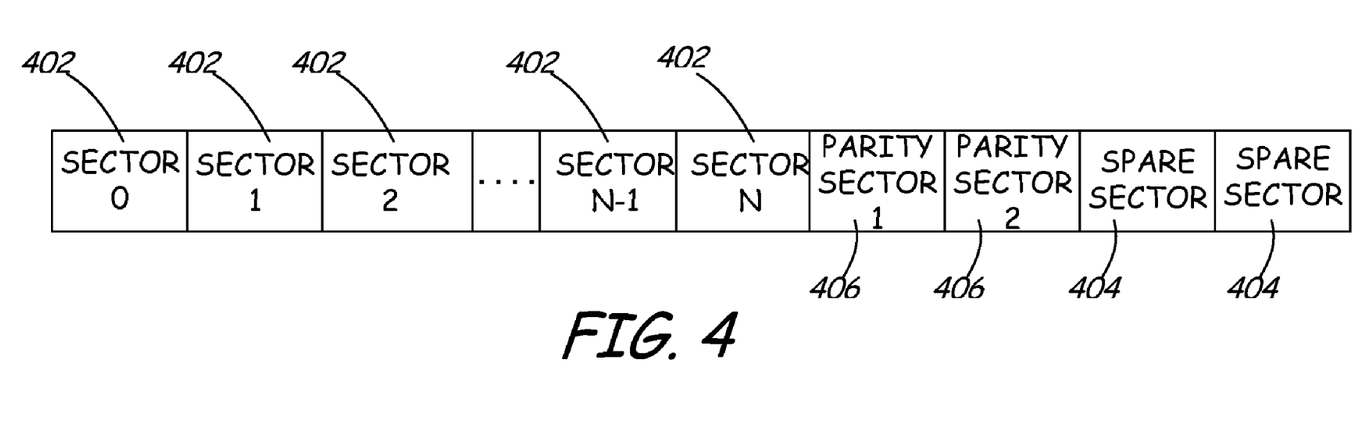
FIG. 4 illustrates an exemplary data track.

FIG. 4 illustrates an exemplary data track 400, which is in one of the load/unload regions. In accordance with the second enhanced error correction process, data track 400 includes a plurality of data sectors 402, at least one spare data sector 404 at the end of the data track and at least one parity sector 406 between the data sectors 402 and the at least one spare sector 404. However, these sectors can be arranged in any order. Each data sector 402 and parity sector 406 includes a padded ECC block for use in the first enhanced error correction process as described above. However, as previously indicated, if the first enhanced error correction process fails to correct all detected errors in a data sector, then a second enhanced error correction process can be attempted using redundancy information in other data sectors within the same data track, for example. This shared redundancy information can be stored in superparity sectors, such as at least one parity sector 406, or at other locations within the data storage system.

Figure 5:
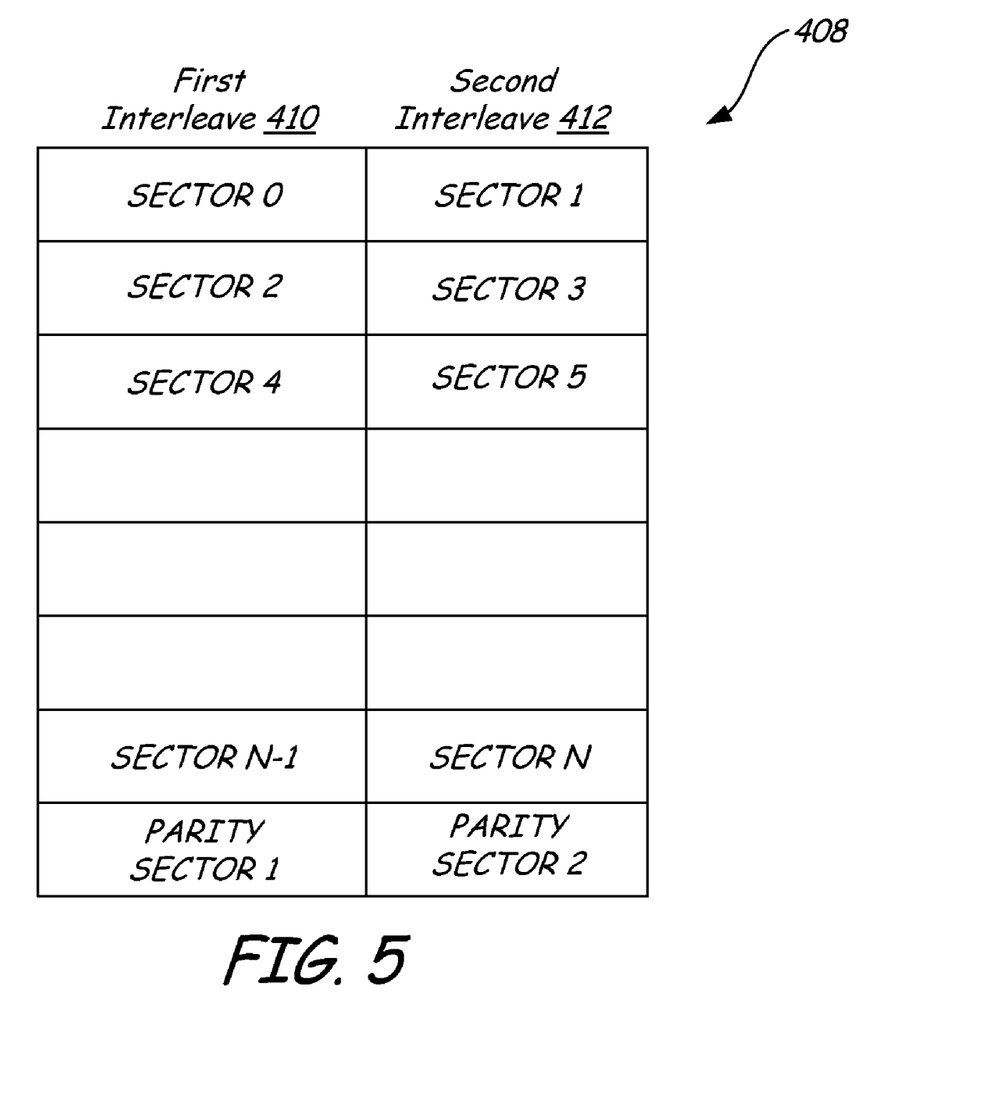
FIG. 5 illustrates an exemplary table illustrating an interleave of data sectors.

A superparity sector 406 can be generated as a function of the data words within a plurality of data sectors in a data track. If all data sectors are used, only a single parity sector is generated. Parity sectors 406 can also be generated as interleaved functions of the data units within each data sector. Interleaving tends to spread out errors across multiple superparity sectors which increases the probability that an error can be corrected. For example and as illustrated in table 408 in FIG. 5, even data sectors (sectors 0, 2, 4, ... N−1) can be used to generate a first superparity sector 406. Such even data sectors have a first interleave 410. Odd data sectors (sectors 1, 3, 5, ... N) can be used to generate a second superparity sector 406. Such odd data sectors have a second interleave 412. It should be understood that a data track can have more than two interleaved sets of data sectors. For example, a data track can have four interleaved sets, such as 0, 4, 8, 12, etc, 1, 5, 9, 13, etc., 2, 6, 10, 14, etc. and 3, 7, 11, 15, etc.

Figure 6:
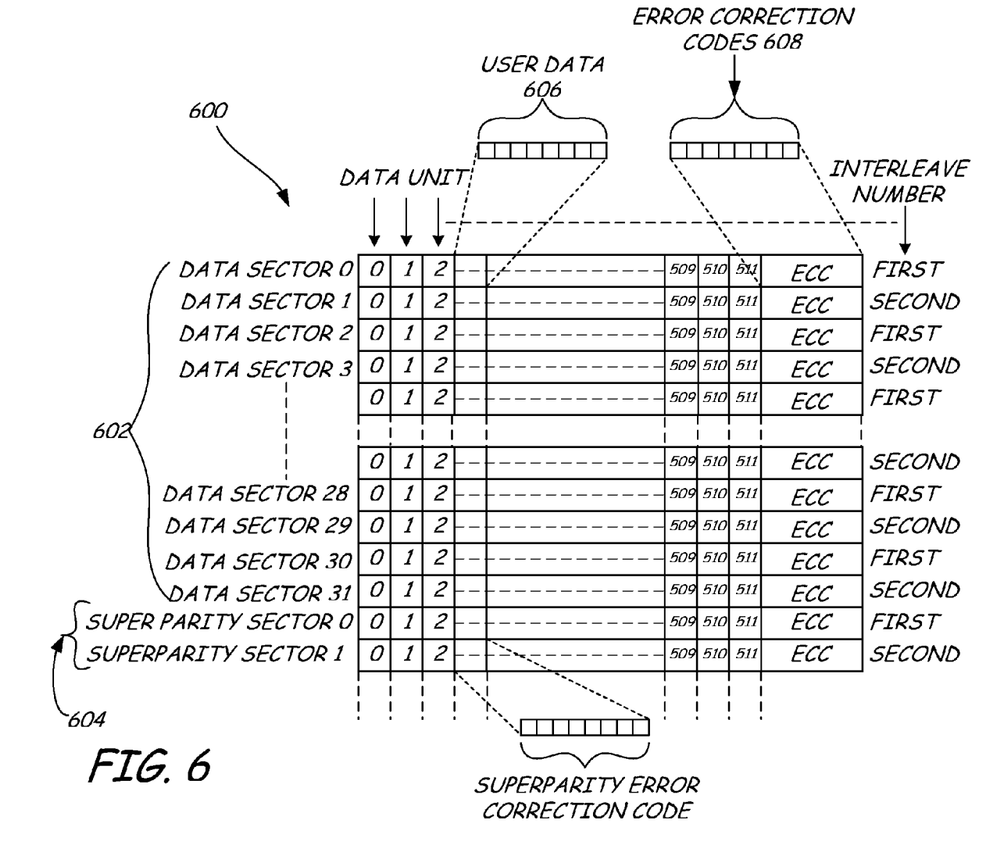
FIG. 6 illustrates a data track with multiple interleaved data sectors and multiple superparity sectors.

FIG. 6 is an exemplary data track 600 illustrating the basis of a superparity sector. Data track 600 includes a plurality of data sectors 602 of which there is a first interleave of sectors and a second interleave of sectors as indicated on the right side of the figure. Each data sector 602 includes a plurality of data units as indicated by data word numbers 0-511. In the example shown in FIG. 6, each data unit is equivalent to a byte of data (i.e., a total of 512 bytes of data per data sector). FIG. 6 illustrates an exemplary data unit 606 that includes bits of user data. Each sector 602 also includes one or more ECC blocks 608, similar to ECC block 148 shown in FIG. 3. ECC blocks 608 are used to implement the first enhanced error correction process for each data sector. In one embodiment, ECC blocks 608 do not extend across a boundary of one data sector into another sector.

Superparity sectors 604 have data units that form ECC blocks, which are calculated as a function of data units that extend across multiple data sectors 602. For example, unit "0" of superparity sector 0 might implement an ECC block that is calculated as a function of the "0" data units from data sectors 0, 2, ... , 30, using an even interleave. Superparity sectors 604, as previously discussed, are used to attempt to correct errors in a data sector that are larger than a maximum threshold of correctable errors provided by an ECC block in that data sector. In addition, each superparity sector 604 includes a padded ECC block similar to sectors 602. Each padded ECC block in superparity sectors 604 is used for recovering data in its corresponding superparity sector in the event that the superparity sector is erroneous.

Figure 7:
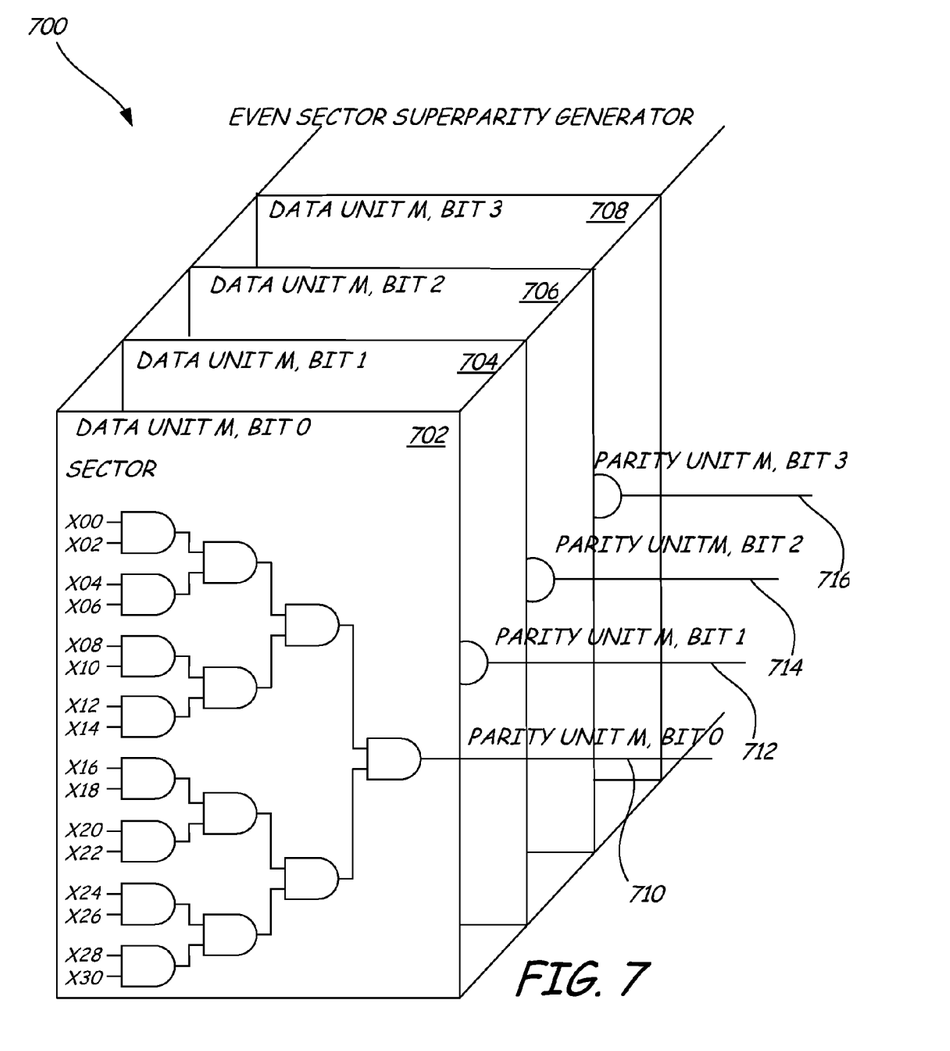
FIG. 7 schematically illustrates an even sector superparity generator.

FIG. 7 schematically illustrates an exemplary even sector superparity generator 700. The even sector superparity sector generator 700 receives bits of data (e.g., X00, X02, X04, X06, ... X30) from a data unit in correspondingly even numbered data sectors 0, 2, 4, 6, ... 30 such as data sectors 602 (FIG. 6). The even sector parity generator 700 includes a number of parity calculation circuits 702, 704, 706, 708. The number of parity calculation circuits is equal to the number of bits per data unit used in the storage system. Each parity calculation circuit (702, 704, 706, 708) receives a particular bit of data (such as bit 0, 1, 2, 3) from each sector and provides a corresponding parity bit output 710, 712, 714, 716 of the same bit number. The parity bit outputs are assembled to form a data unit in a superparity error correction code (such as data unit 0 in superparity sector 0 in FIG. 6). Each parity calculation circuit (702, 704, 706, 708) includes a number of XOR gates as illustrated. Other types of parity generators can also be used.

Figure 8A:
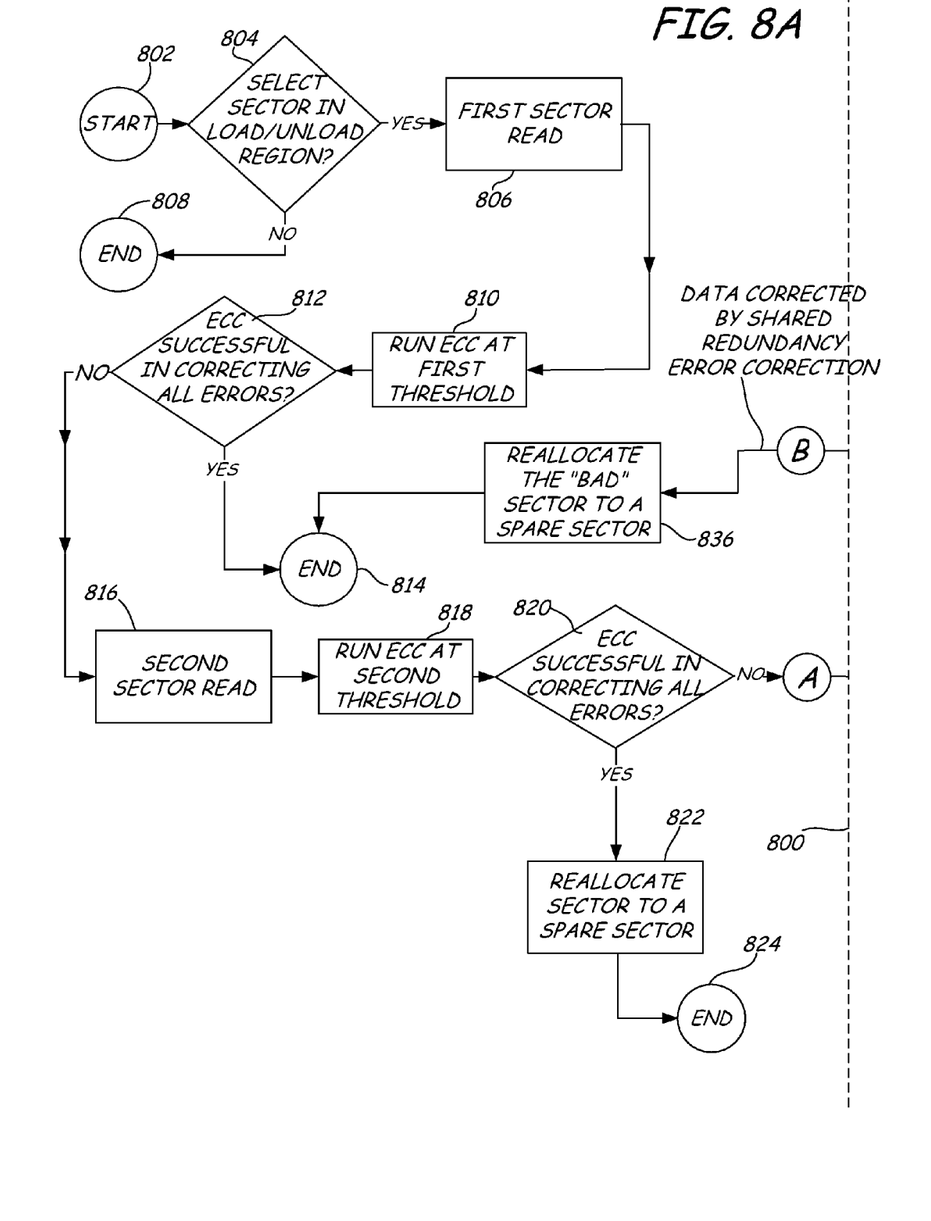
FIGS. 8A, 8B taken together, illustrate a process flow chart of a method of recovering data from a load/unload region of a storage medium.
Figure 8B:
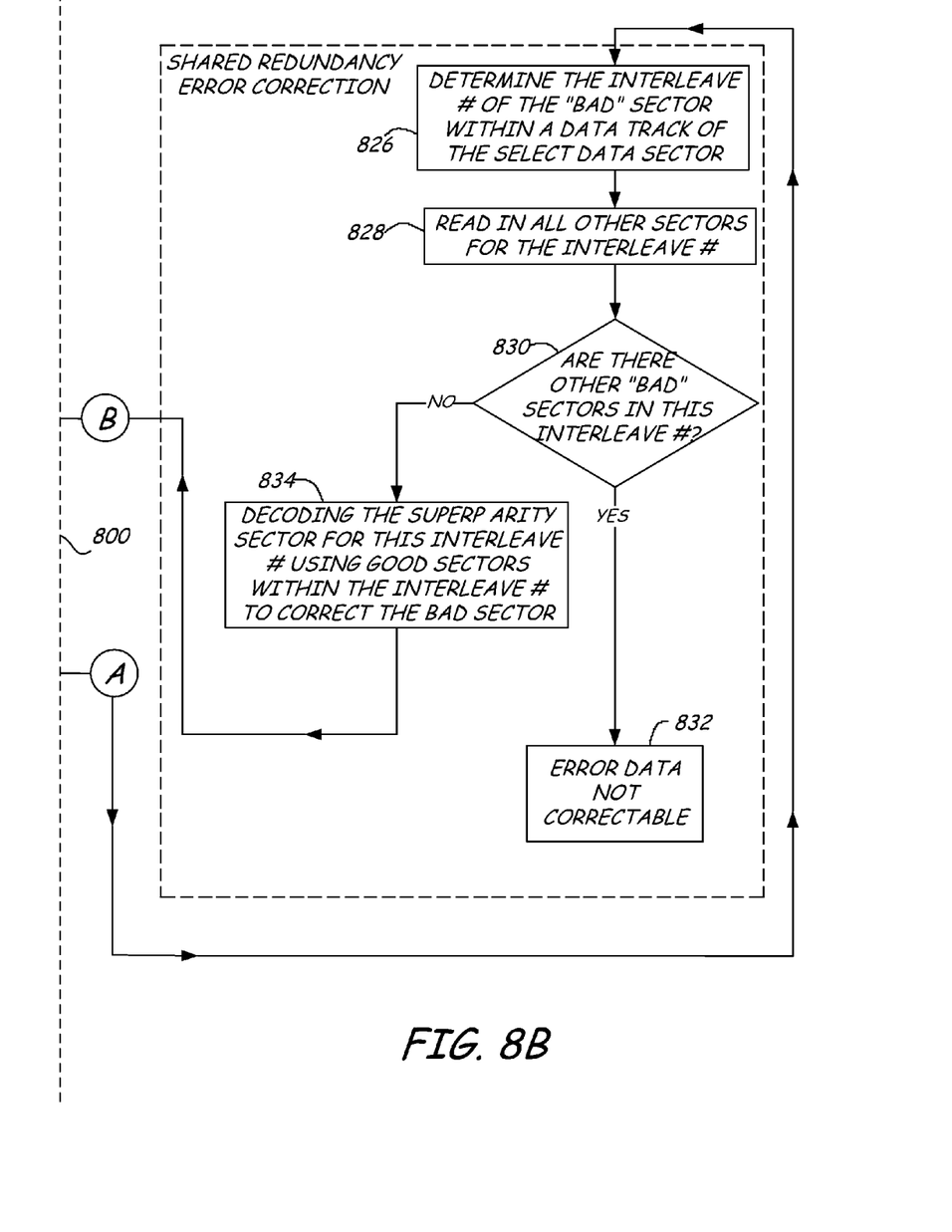

FIGS. 8A, 8B, taken together, illustrate a process flow chart for recovering data in a load/unload region of a storage medium in accordance with an embodiment of the disclosure. FIG. 8A can be joined to FIG. 8B along a dashed line 800 that is common to both drawings. Transfer bubbles A and B indicate lines of process flow that connect FIGS. 8A and 8B. In general, FIG. 8A illustrates the first enhanced error correction process (previously discussed), while FIG. 8B illustrates the second enhanced error correction process or an exemplary type of shared redundancy error correction in the form of interleaved superparity as previously discussed in regards to FIGS. 4-7.

The process begins at START 802 and continues to a decision block 804. At decision block 804, it is determined whether a selected data sector, such as data sector 138 illustrated in FIGS. 2 and 3 is in load/unload region 134 or 136 of storage medium 112. If the data sector is in the load/unload region of the storage medium, then the process continues to action block 806. If the data sector is not in the load/unload region of the storage medium, then the process ends at END 808 (whereby a traditional EC decode and corrective scheme might be used). At action block 806, a first read of the data sector is accomplished and the process proceeds to action block 810. At action block 810, an ECC codeword for the selected data sector is decoded and ran up to a first threshold level of correctable errors, and the process proceeds to decision block 812. As previously described, for example, a first threshold level of correctable errors, such as 20 correctable errors, can be a value that is less than a maximum level of correctable errors. At decision block 812, it is determined whether the decode process in action block 810 was successful in correcting all detected errors. If not all detected errors were corrected, then the process continues to action block 816.

At action block 816, a second read of the selected data sector is accomplished and the process proceeds to action block 818. The step can include re-reading the data sector from a read buffer in a controller of the data storage system or re-reading the data sector from the disc. At action block 818, the ECC codeword is decoded and ran up to a second threshold level of correctable errors, and the process proceeds to decision block 820. As previously described, for example, the second threshold level of correctable errors is a maximum level of correctable errors, such as a value of 30 correctable errors provided by the particular ECC scheme and size of redundancy. At decision block 820, it is determined whether the second decode process was successful in correcting all detected errors in the selected data sector. If the decode process in action block 818 was successful, then the process proceeds to action block 822. At action block 822, the selected data sector is reallocated to a spare data sector and the process ends at END 824. If the decode process in action block 818 was unsuccessful in correcting all detected errors in the selected data sector, then the process continues to action block 826 to invoke the second enhanced error correction scheme (shared redundancy error correction or superparity error correction).

At action block 826 (FIG. 8B), the interleave number of the "bad" data sector within a data track of the select data sector is determined. At action block 828, all other data sectors within the same data track that have the interleave number of the "bad" data sector are read. The process then continues to decision block 830. At decision block 830, the data sectors read at action block 828 are tested according to steps 906-820 in FIG. 8A to find out if there are any other "bad" data sectors in the interleave number that has the "bad" data sector. If there are any other "bad" data sectors present, then errors are not correctable with the second enhanced error correction or shared redundancy error correction, and the process continues to an error trap action block 832. If there are no other "bad" data sectors present, the process continues from decision block 830 to action block 834. At action block 834, shared redundancy error correction is performed to correct the "bad" data sector.

For example, for each data word "0" of the "bad" sector, the corresponding superparity sector word "0" can be read to detect and correct errors in the corresponding data words of each interleaved sector (including the "bad" sector). The process continues to transfer bubble B and to action block 836 to reallocate the "bad" data sector to a spare sector and the process ends at END 814. While the process flowchart in FIG. 8B illustrates the second enhanced error correction as utilizing an interleaved superparity sector, it should be understood that the second enhanced error correction can utilize a single superparity sector that includes information related to all data sectors in the data track or any portion thereof.

In action blocks 822 and 836, successful correction of errors in a data sector are reallocated to a spare sector. In accordance with embodiments of the disclosure, to ensure that all data sectors including reallocated data sectors in the load/unload region fall within a single track boundary after reallocation, a number of spare data sectors are allocated on each track, such as spare sectors 404 in FIG. 4. As corrected data is in need of reallocation, as is the case in action block 822 and 826, data sectors are reallocated to spare data sectors on the same track. However, if a particular data track has more data sectors in need of reallocation than allotted spare data sectors, then the particular track is marked as a defective track and reassigned wholly to a spare track. Such a method of reallocation minimizes impact in data throughput. Fragmented reallocated data sectors can be detrimental to data throughput performance.

It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matter of structure and arrangement of parts within the principles of the present invention to the full extent indicated by the broad general meaning of the terms in which the appended claims are expressed. For example, the particular elements may vary depending on the particular application for the error correction system while maintaining substantially the same functionality without departing from the scope of the present invention. In addition, although the embodiments described herein are directed to a data storage system for non-volatile storage of data, it will be appreciated by those skilled in the art that the teaching so the disclosure can be applied to the correction of errors in volatile memory or dynamic memory, without departing from the scope of the invention.

What is claimed is:

1. A method of recovering data on a storage medium comprising:
   performing a first error correction scheme on a first region of the storage medium, the first error correction scheme comprising:
      performing a first process including correcting errors in a selected data storage segment based on information obtained from the select data storage segment;
      performing a second process if the first process to correct the errors was unsuccessful, the second process including correcting the errors in the selected data storage segment based on information obtained from multiple other data segments; and
   performing a second error correction scheme on a remaining region of the storage medium.

2. The method of claim 1, wherein performing the first process of the first error correction scheme on the first region of the storage medium comprises:
   reading the selected data storage segment from the first region;
   performing a first enhanced error correction process including:
      decoding the selected data storage segment using an error correction code and correcting errors up to a first threshold level of correctable errors; and
      decoding the selected data storage segment using the error correction code and correcting errors up to a second threshold level of correctable errors if decoding and correcting up to the first threshold level was unsuccessful in correcting all errors in the selected data storage segment.

3. The method of claim 2, further comprising re-reading the selected data storage segment prior to decoding and correcting errors up to the second threshold level of correctable errors.

4. The method of claim 2, further comprising reallocating the selected data storage segment to a spare data storage segment if decoding and correcting errors up to the second threshold level of correctable errors on the selected data storage segment is successful.

5. The method of claim 4, wherein reallocating the selected data storage segment to a spare data storage segment comprises reallocating the selected data storage segment to a spare data storage segment in a data track of the selected data storage segment.

6. The method of claim 5, further comprising reallocating the data track of the selected data storage segment to a spare data track if there are no spare data storage segments available in the data track for reallocating the selected data storage segment.

7. The method of claim 2, wherein the second process of the first error correction scheme comprises:
   performing a second enhanced error correction process utilizing a superparity sector generated from a plurality of data storage segments including the selected data storage segment.

8. The method of claim 7, further comprising reallocating the selected data storage segment to a spare storage segment if the second enhanced error correction process was successful in correcting all errors in the data storage segment.

9. A method of recovering data on a storage medium comprising:
   decoding a selected data sector using an error correction code and correcting errors up to a first threshold level of correctable errors;
   decoding the selected data sector using the error correction code and correcting errors up to a second, greater threshold level of correctable errors if decoding and correcting errors up to the first threshold level of correctable errors was unsuccessful in correcting all errors in the select data sector; and
   performing error correction using a superparity sector that corresponds with the selected data sector to correct errors in the selected data sector if decoding and correcting errors up to the second threshold was unsuccessful, wherein the superparity sector is generated from a plurality of data sectors including the selected data sector.

10. The method of claim 9, wherein the selected data sector of which error correction is performed is located in a load/unload region of the storage medium.

11. The method of claim 9, wherein the second threshold level of correctable errors corresponds to a maximum threshold of correctable errors provided by the error correction code.

12. The method of claim 9, further comprising rereading the selected data sector prior to decoding and correcting errors up to the second threshold level of correctable errors.

13. The method of claim 9, further comprising reallocating the selected data sector to a spare data sector in a data track of the selected data sector decoding and correcting errors up to the second threshold level of correctable errors on the selected data sector is successful in correcting all errors in the selected data sector.

14. The method of claim 9, further comprising reallocating the selected data sector to a spare data sector if performing error correction using the superparity sector to correct errors in the selected data sector was successful in correcting all errors in the selected data sector.

15. A method of recovering data from a storage medium comprising performing a first enhanced error correction including:
   decoding a selected data sector in a first region of the storage medium using an error correction code and correcting errors up to a first threshold level of correctable errors; and
   decoding the selected data sector in the first region of the storage medium using an error correction code and correcting errors up to a second threshold level of correctable errors if decoding and correcting errors up to the first threshold level of correctable errors was unsuccessful in correcting all errors in the selected data sector.

16. The method of claim 15, wherein the second threshold level of correctable errors corresponds to a maximum threshold of correctable errors provided by the error correction code.

17. The method of claim 15, further comprising reallocating the selected data sector to a spare data sector in the first region of the selected data sector if decoding and correcting errors up to the second threshold level of correctable errors is successful in correcting all errors in the selected data sector.

18. The method of claim 17, further comprising reallocating the data track of the selected data sector to a spare data track if there are no spare data sectors available in the first region for reallocating the selected data sector.

19. The method of claim 16, further comprising:
   performing a second enhanced error correction process decoding and correcting errors up to the second threshold was unsuccessful, wherein the second enhanced error correction process utilizes a superparity sector generated from a plurality of data sectors including the selected data sector.

20. The method of claim 19, further comprising reallocating the selected data sector to a spare data sector if performing the second enhanced error correction process was successful.

21. The method of claim 1, wherein the first region of the storage medium comprises a load/unload region for loading and/or unloading a transuding head.

* * * * *